United States Patent [19]

Ray et al.

[11] 4,441,174
[45] Apr. 3, 1984

[54] STACKED MARINE SEISMIC SOURCE

[75] Inventors: Clifford H. Ray; Neil A. Moore, both of Houston, Tex.

[73] Assignee: Fairfield Industries, Inc., Houston, Tex.

[21] Appl. No.: 291,269

[22] Filed: Aug. 10, 1981

[51] Int. Cl.³ .......................... G01V 1/36; G01V 1/38
[52] U.S. Cl. ......................................... 367/23; 367/24
[58] Field of Search ...................... 367/16, 23, 24, 57, 367/48; 181/110, 111

[56] References Cited

U.S. PATENT DOCUMENTS

| 2,953,214 | 9/1960 | Menter | 367/23 |
| 3,195,676 | 7/1965 | Eisler et al. | 367/57 |
| 3,331,050 | 7/1967 | Kilmer et al. | 367/23 |
| 3,339,176 | 8/1967 | Sparks | 367/23 |
| 4,254,480 | 3/1981 | French | 367/23 |
| 4,353,121 | 10/1982 | Ray et al. | 367/48 |

OTHER PUBLICATIONS

Ray, "High Resolution Using the Fairflex . . . ", 11/2/78 Soc. Explor. Geophys. Annu.-MTG.; #48, p. 35, TI and ST. only.
Ray, "Exploration Targets Using the Fairflex . . . ", 11/8/79, Soc. Explor. Geophys. Annu. Mtg. vol 49, p. 38, TI & ST. only.

Primary Examiner—Nelson Moskowitz
Attorney, Agent, or Firm—Frank S. Vaden, III; Marvin B. Eickenroht; Emil J. Bednar

[57] ABSTRACT

An arrangement of a plurality of individual gas expansion marine sources, wherein the positive waves of the primary shocks are additive in effect, the negative waves of the primary shocks are additive in effect to cause blow-out so that the reflections are relatively small or ghost-free with respect to the positive, and wherein the positive and negative waves of the aftershock occurrences do not enhance one another.

17 Claims, 4 Drawing Figures

FIG. 1
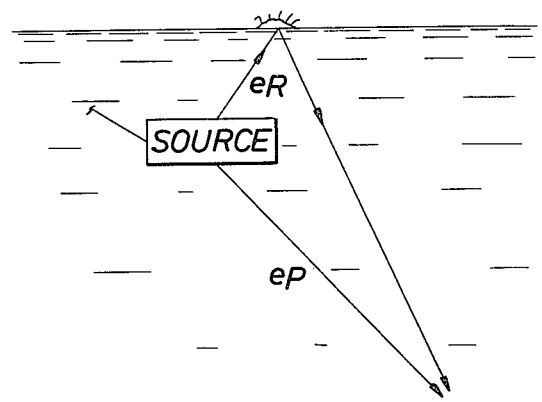
FIG. 2
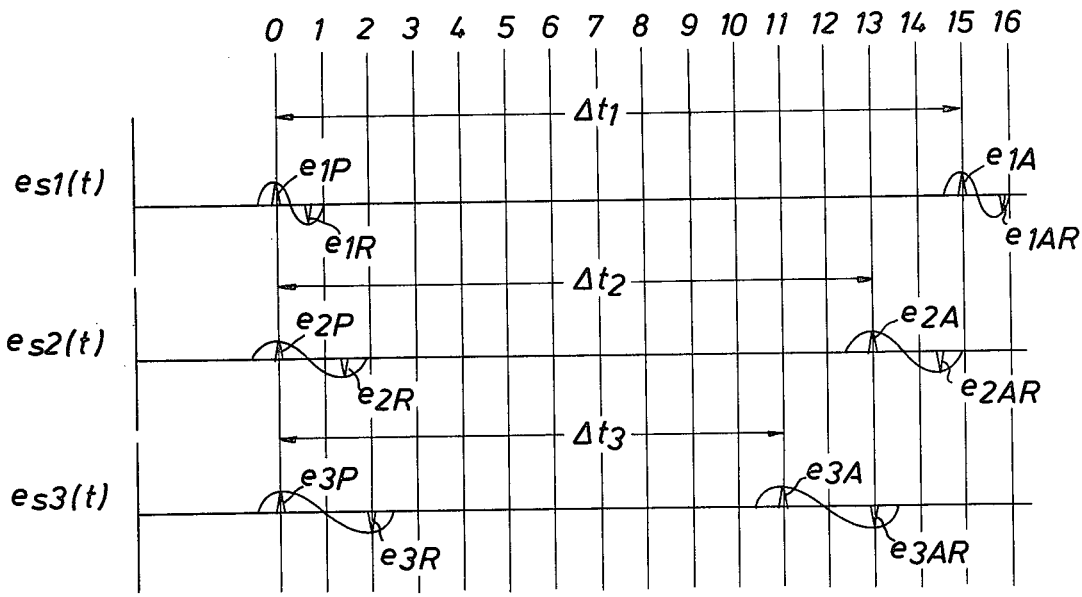
FIG. 3
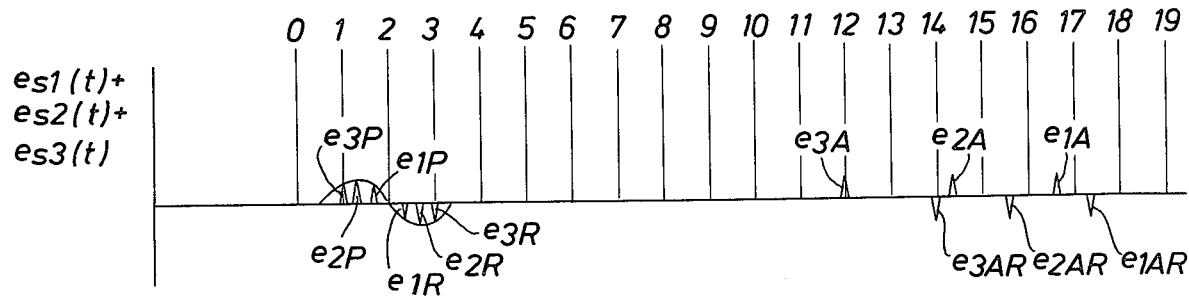
FIG. 4

STACKED MARINE SEISMIC SOURCE

BACKGROUND OF THE INVENTION

1. Field of the Invention

This invention pertains to marine seismic sources and more particularly to an improved seismic source having a plurality of flexible, expansible enclosures, each enclosure utilizing an explosive gaseous mixture.

2. Description of the Prior Art

Various seismic wave generators have been employed in the past, starting with controlled dynamite charges as a source of energy. The most promising of the various sources employed today use explosive gas mixtures which explode either in open-bottomed domes or into various enclosures.

One very successful gas exploder employing a closed enclosure is disclosed in U.S. Pat. No. 3,480,101 entitled "Seismic Wave Source Using Explosive Gas in an Expansible Enclosure," issued Nov. 25, 1969 in the name of Adelbert Barry et al. The disclosure of this patent is incorporated by reference for all purposes.

A feature of the device disclosed in patent '101 and similar devices is that when the device is set off beneath the surface of the water, there is a primary energy shock imparted to the water and, after a period of time, there is an after-shock imparted to the water. The most popular explanation as to why and when this after-shock energy pulse occurs involves the effect of the hydrostatic pressure of water on the expansion enclosure or sleeve. That is, the sleeve expands the first time with gas explosion against the hydrostatic pressure of the water on the sleeve. This pressure causes the sleeve to contract or collapse; however, the gas in the chamber is sufficient, as there is pressure relief around the sleeve caused by the initial shock, to cause a second and lesser expansion to occur. Hence, there is an occurrence of a second shock.

Although the dynamics of gas expansion and external hydrostatic pressure and other related phenomena may not be completely understood or comprehended, the after-shock occurrence is undeniably present and very observable. Furthermore, it is also known that as the depth of the seismic source increases, the time between the primary shock and the after shock decreases, again probably because of the dynamic effect of the increased hydrostatic pressures at the greater depths.

A single primary source of the type described in the '101 patent produces a pulse with a relatively uniform energy amplitude over a range of frequencies from about 40 Hz to 1200 Hz. It is known that the energy in the higher frequencies of this range are not particularly useful for exploration targets deeper than about 3000 feet; therefore, it is desirable to expend proportionally more energy at lower frequencies than is available in known prior art sources.

A primary pulsing of energy from a seismic energy source of the type described above has both a positive portion and a negative portion immediately following as a result of reflection from the water surface. The aftershock pulsing of energy also includes both a positive and negative portion at a slightly later time, as mentioned above. The net effect of the two shocks of the type described occurring one after the other is that, in the frequency domain, one or more notches are established in the lower part of the frequency spectrum of interest. It is desirable to eliminate or greatly smooth the notching effect that results from operation of the source such as described above.

Sources which are activated on the surface of the water only have components of radiating energy outwardly and downwardly. A source that is activated somewhat below the surface of the water produces a wave in an upward direction, as well, which returns as a reflected or ghost pulse in a negative polarity with respect to the initial positive polarity. If there is no escaping energy at the surface at the time of reflection (i.e., no surface "blow-out"), then substantially the same amount of energy is reflected as initially produced. When there is "blow-out", then the amount of energy reflected is equal to one bar (i.e., one atmosphere of pressure). Having blow-out is desirable in a sense. A large shock produces a large positive portion, but a negative portion that does not exceed the predetermined value of one bar. Therefore, the result is a relatively large positive pulse and a relatively limited negative pulse, which is a desirable source shape.

However, it may be seen that a deeper source has to produce a greater shock to produce blow-out than a shallower source. This means that the positive and negative energy amplitude remain the same at a higher level for the deeper sources, resulting in notching and other undesirable characteristics at a higher energy level. It is desirable to have a limited negative portion with respect to the positive portion of an energy shock, even at greater depths, which has not been heretofore possible with the known prior art source devices.

Therefore, it is a feature of the present invention to provide an improved seismic marine source of the gas expansion type to enhance the primary shock energy therefrom while not enhancing the after-shock energy.

It is yet another feature of the present invention to provide an improved seismic marine source of the gas expansion type to smooth the frequency spectrum notches at the lower frequencies.

It is still another feature of the present invention to provide an improved seismic marine source of the gas expansion type that produces large positive energy pulses while producing relatively small negative energy pulses even from sources located relatively deeply in the water.

It is yet another feature of the present invention to provide an improved seismic marine source of the small diameter sleeve, gas-expansion type to enhance the output in the frequency range from about 25-250 Hz, which is an improvement over prior art sources.

SUMMARY OF THE INVENTION

In accordance with the present invention, two or preferably three or four sources of the type of gas expansion seismic sources such as described in the '101 patent are horizontally positioned one above the other, all of which are located below the surface of the water. Typically, when three sources are stacked, the most shallow is placed at a distance of two feet beneath the water surface, the intermediate source is placed at a distance of three and one-half feet beneath the surface, and the deepest of the three sources is located at a distance of five feet below the surface. All are wired for substantially simultaneous detonation.

Following detonation or activation of the sources at a point below all of the individual sources, the positive portions from the deepest source arrives, then the intermediate source and finally the shallowest source. The next-to-arrive pulse is the negative pulse from the shallowest source, then the intermediate source and then the deepest source. The resulting energy envelope of the pulses is a spread positive wave followed by a spread negative wave. The three positive pulses enhancing each other followed by the three negative pulses enhancing each other.

The arrival of the individual after-shock pulses produces a different result. The first to occur below the area where the sources are located is the positive pulse from the deepest source, then the negative pulse therefrom, then the positive pulse from the intermediate source, then the negative pulse therefrom, then the positive pulse from the most shallow of the sources and, finally, the negative pulse from the shallowest source. Hence, the positive pulses and negative pulses are interspersed and there is no pulse enhancement with respect to the after-shock pulses as there is with respect to the primary shock pulses.

The cumulative effect of the pulses moving upwardly from the intermediate source and from the deepest source is to add to the pulse moving upwardly and from the shallowest source. Hence there is continuous blow out from levels of pulse energy at depths where there are no blow outs at the surface with one source used alone at such depths. The result is that for sources at greater depths, the positive pulse of the primary shock wave can be greatly enhanced without the corresponding enhancement of the negative pulse of the primary wave. This is an advantage.

BRIEF DESCRIPTION OF THE DRAWINGS

So that the manner in which the above-recited features, advantages and objects of the invention, as well as others which will become apparent, are attained and can be understood in detail, more particular description of the invention briefly summarized above may be had by reference to the embodiment thereof which is illustrated in the drawings, which drawings form a part of this specification. It is to be noted, however, that the appended drawings illustrate only a preferred embodiment of the invention and are therefore not to be considered limiting of its scope, for the invention may admit to other equally effective embodiments.

IN THE DRAWINGS

FIG. 1 is a schematic representation of a marine seismic sonic being detonated in accordance with the present invention.

FIG. 2 is a schematic representation of a marine seismic source in accordance with a preferred embodiment of the present invention which includes three stacked sources.

FIG. 3 are time domain diagrams of the primary and after-shock enerby waves from three stacked sources in accordance with the present invention.

FIG. 4 is a combined time domain diagram of the primary and after-shock energy waves from three stacked sources in accordance with the present invention.

DESCRIPTION OF THE PREFERRED EMBODIMENT

In marine seismic surveying it is normal for a marine seismic vessel to track along a predetermined course on the surface of a body of water, normally the sea. An energy source is towed by the vessel for imparting pulses downwardly into the water. Although it is possible to tow the source on the surface, it is normally towed beneath the surface where the water is more stable than the surface.

A preferred energy source has heretofore been the Fairflex ™ minisleeve exploder system of Fairfield Industries, Inc., which system's essential elements are described in U.S. Pat. No. 3,480,101, which patent disclosure is incorporated herein by reference for all purposes. Sometimes this type of source is referred to as a gas expansion source. Such a source provides an energy pulse length of less than one-millisecond positive pressure and produces a nearly perfect acoustic wavelet having a finite period of less than three milliseconds and a broad frequency spectrum with a maximum frequency at about 200–250 Hz, gently rolling above and below the maximum for about three octaves. The wavelet is the result of a positive energy portion progressing downwardly into the water for bottom surface and sub-bottom surface reflection, such as shown as $e_p$ in FIG. 1, and a negative or ghost energy portion progressing downwardly into the water following reflection at the water/air interface. This portion of the expanded source energy is shown as $e_R$ in FIG. 1.

Also towed by the vessel is a cable or streamer along which are located a plurality of hydrophone arrays or detectors for receiving the seismic reflections. It is desirable that the source be large, undistorted, at a low frequency and free of interferring energy impulses.

As discussed above, a single source of the type described produces energy detectable at a point below the source comprising a primary positive energy portion, a primary negative or ghost energy portion, an after-shock positive energy portion and an after-shock negative or ghost energy portion. The combination of individual sources each producing portions of the kind described, results in an enhancement/non-enhancement combination that is far superior to any individual souce.

In this arrangement, as shown in FIG. 2, source S1 is located at a distance $d_1$ below the surface of the water; source S2 is located therebeneath at a distance $d_2$ below the water surface; and source S3 is located at a deeper level yet below source S1 at a distance $d_3$ below the water surface. In one preferred arrangement, $d_1$ is equal to 2 feet; $d_2$ is equal to $3\frac{1}{2}$ feet; and $d_3$ is equal to 5 feet. The velocity of sound traveling in water is approximately 5000 feet per second. Hence, the time for sound to travel from source S1, to the surface to be reflected therefrom and return to source S1 is approximately 0.8 milliseconds based on the formula $2 \cdot d_1/5000$. Similarly, the round-trip time for an energy pulse from source S2 to return thereto is 1.4 milliseconds and the round-trip time for an energy pulse from source S3 to return thereto is 2.0 milliseconds.

Diagrammatically, the positive and negative portions for the primary pulses from each of sources S1, S2 and S3 are shown in FIG. 3. The pulse portions for source S1 are shown on the top line as $e_{1P}$ and $e_{1R}$; the pulse portions for source S2 are shown on the middle line as $e_{2P}$ and $e_{2R}$; and the pulse portions for source S3 are shown on the bottom line as $e_{3P}$ and $e_{3R}$, respectively. If it is assumed that the positive pulses all originate substantially simultaneously, then the respective occurrences for the three sources are accurately reflected in the drawing.

It has been measured that the positive portion of the after-shock wave occurs at a $\Delta t_1$ after the positive portion of the primary wave of about 15 milliseconds for a source S1 located at a depth of 2 feet; that the positive portion of the after-shock wave occurs at a $\Delta t_2$ after the positive portion of the primary wave of about 13 milliseconds for a source S2 located at a depth of 3½ feet; and that the positive portion of the after-shock wave occurs at a $\Delta t3$ after the positive portion of the primary wave of about 11 milliseconds for a source S3 located at a depth of 5 feet. The negative portion of each of these after-shock waves follow their respective positive portions by the same amount of time the negative portions follow their respective positive portions for the primary wave.

The after-shock portions for the waves emanating from sources S1 are labelled $e_{1A}$ and $e_{1AR}$ in FIG. 3; the after-shock portions for the waves emanating from source S2 are labelled $e_{2A}$ and $e_{2AR}$; and the after-shock energy wave portions for the waves emanating from source S3 are labeled $e_{3A}$ and $e_{3AR}$.

It may now be observed what the cumulative effect is of all three sources S1, S2 and S3 at a location below the three "stacked" sources by observing the diagram set forth in FIG. 4. Arbitrarily a location of 5 feet is selected below source S3 where the wave portions from source S3 arrive just 1 millisecond later than at source S3. As will be seen, the first to arrive wave is $e_{3P}$, then 0.3 milliseconds later $e_{2P}$ and then 0.3 milliseconds later $e_{1P}$. These combine to make a large extended positive pulse envelope in the frequency range between 25–250 Hz. The next to arrive portion is the $e_{1R}$ at a time 0.8 milliseconds after $e_{1P}$, then $e_{2R}$ at a time 0.3 milliseconds later and then $e_{3R}$ at a time 0.3 milliseconds still later. Again, the negative portions combine to make a large single extended pulse in the frequency range between 25–250 Hz.

The next-to-arrive pulse is $e_{3A}$, then at a time of 2 milliseconds later, $e_{3AR}$. Then, at a time of 0.3 milliseconds after $e_{3AR}$, $e_{2A}$ arrives followed by e2AR at a time of 1.4 milliseconds later. At a time 0.9 milliseconds later $e_{1AR}$ arrives. It should be noted that the positive portions are interspersed with the negative portions for the after-shock waves and, therefore, there is no enhancement of such waves as with the primary waves.

The blow out effect on the ghost or negative portions should now be considered. A shock wave imparted somewhat below the surface of the water may or may not cause surface blow out depending on the amplitude of the shock. If the magnitude of the shock is less than enough to cause blow out, then the amplitude of the reflected or ghost wave at the surface will be very nearly the same amplitude as the direct or positive wave from the source. On the other hand, if the magnitude of the shock is more than eough to cause blow out, the negative or reflected wave will be limited to one bar of pressure whereas the positive shock will be more than that. If the difference is relatively great, then the ghost or negative portion is small with respect to the positive portion, which is generally thought of as an advantage for a seismic shock wave produced by a source.

A single source at a shallow depth may cause blow out whereas the same source at a greater depth will not, allowing the negative or ghost reflection to be substantially the same amplitude as the positive wave.

However, the stacked arrangement which has been just described produces a cumulative effect on the blow out phenomenon. The upward wave from the top source arrives just a fraction of a millisecond ahead of a simultaneously detonated source one and one-half feet below the first source. And, the upward waves from the top and intermediate sources arrive just a fraction of a millisecond ahead of a simultaneously detonated third source just one and one-half feet below the second source. The cumulative effect is that effectively blow out occurs for all three upward waves whereas the force from even the top source acting alone may not have been sufficient for blow out. The downward direct or positive wave also is enhanced by the cumulative gathering shock wave so that there is relatively strong enhancement of the stacked source detonations for the positive wave with respect to the negative wave. The negative wave tends to flatten a bit, but otherwise, there is no amplitude enhancement. And, in fact, the negative portion amplitude for the deepest source is less than it would have been for detonation of that source alone.

The stacked arrangement also has a salutary effect on the notching caused in the frequency spectrum by the energy wave from a single source. Because of the hydrostatic pressure of the water, the deeper the source, the shorter the period of the energy pulse. Since the frequency spectrum is therefore different for each of three successively deeper sources, the notches that occur for each of the three are slightly displaced from each other, the cumulative effect being a disappearance of notches for the overall energy pulse.

The above discussion has been with respect to vertically stacked sources simultaneously exploded. Please note that by not vertically stacking, such as shown be dotted sections in FIG. 2, and by detonating not at the same instant of time, it is possible to minimize the mechanical interference effect of one source being above another and also somewhat to establish directivity to the advancing wave front. The principal operating mode that permits enhancement of the primary positive wave while not enhancing the after shock waves is within the scope of the present invention.

While a particular embodiment of the invention has been shown and described, it will be understood that the invention is not limited thereto, since many modifications may be made and will become apparent to those skilled in the art. For example, different spacings, more than three stacked sources and the like can be employed.

What is claimed is:

1. A marine seismic wave source, including a plurality of individual gas expansible sources, each of said sources producing a primary shock wave into the water from the location where said source is positioned, each of said sources also producing an after shock wave into the water a predetermined time after said primary shock wave, comprising;

a first of said individual sources located at a first depth below the surface of the water, the negative portion of said primary wave from said first source being separated from the positive portion thereof dependent on the round-trip acoustical travel time of the source impulse to the water surface, the positive portion of the after shock wave therefrom occurring at a time after the primary shock wave dependent on the pressure of the water at said first depth, the negative portion of said after shock wave being separated from its positive portion by the same time separation that the negative portion of the primary wave is separated from its positive portion, a second of said individual sources located at a second depth below the surface of the water greater than said first depth, the negative portion of said primary wave from said second source being separated from the positive portion thereof dependent on the round-trip acoustical travel time of the source impulse to the water surface, the positive portion of the after shock wave therefrom occurring at a time after the primary shock wave dependent on the pressure of the water at said second depth, the negative portion of said after shock wave being separated from its positive portion by the same time separation that the negative portion of the primary wave is separated from its positive portion, the round-trip time for said second source being longer than the round-trip time for said first source, the pressure for said second source being greater than the pressure for said first source, thereby causing the relative time of arrival of said after shock for said second source to be shorter than for said first source, said positive portions of the primary waves from said first and second sources occurring at a location below said second source before the negative portions of the primary waves from said first and second sources occur at said location, said negative portion of the after shock wave from said first source occurring before the positive portion of the after shock wave from said second source occurs at said location, whereby, the primary shock wave energy accumulates in a frequency spectrum range lower than the frequency spectrum for said individual first and second sources.

2. A marine seismic source in accordance with claim 1, wherein the primary shock wave energy accumulates in a frequency range primarily between 25 and 250 Hz.

3. A marine seismic source in accordance with claim 1, whereby the after shock wave energy does not accumulate.

4. A marine seismic wave source in accordance with claim 1, wherein said first and second sources are detonated substantially simultaneously.

5. A marine seismic wave source in accordance with claim 1, wherein said first and second sources are vertically stacked.

6. A marine seismic wave source in accordance with claim 5, wherein said first source is located approximately two feet below the surface of the water and wherein said second source is located approximately three and one-half feet below the surface of the water.

7. A marine seismic wave source in accordance with claim 1, and including;

a third individual source located at a third depth below the surface of the water greater than said second depth, the negative portion of said primary wave from said third source being separated from the positive portion thereof dependent on the round-trip acoustical travel time of the source impulse to the water surface, the positive portion of the after shock wave therefrom occurring at a time after the primary shock wave dependent on the pressure of the water at said third depth, the negative portion of said after shock wave being separated from its positive portion by the same time separation that the negative portion of the primary wave is separated from its positive portion, the round-trip time for said third source being longer than the round-trip time for said second source, the pressure for said third source being greater than the pressure for said second source, thereby causing the relative time of arrival of said after shock for said third source to be shorter than for said second source, said positive portions of the primary waves from said first, second and third sources occurring at a location below said third source before the negative portions of the primary waves from said first, second and third sources occur at said location, said negative portion of the after shock wave from said first source occurring before the positive portion of the after shock wave from said second source occurs at said location, said negative portion of the after shock wave from said second source occurring before the positive portion of the after shock wave from said third source occurs at said location, whereby, the primary shock wave energy accumulates in a frequency spectrum range lower than the frequency spectrum for said individual first, second and third sources.

8. A marine seismic source in accordance with claim 7, wherein the primary shock wave energy accumulates in a frequency range primarily between 25 and 250 Hz.

9. A marine seismic wave source in accordance with claim 7, wherein said first, second and third sources are detonated substantially simultaneously.

10. A marine seismic wave source in accordance with claim 7, wherein said first, second and third sources are vertically stacked.

11. A marine seismic wave source in accordance with claim 10, wherein said first source is located approximately two feet below the surface of the water, said second source is located approximately three and one-half feet below the surface of the water and said third source is located approximately five feet below the surface of the water.

12. A marine seismic wave source in accordance with claim 1 including;

a fourth individual source located at a fourth depth below the surface of the water greater than said third depth, the negative portion of said primary wave from said fourth source being separated from positive portion thereof dependent on the round-trip acoustical travel time of the source impulse to the water surface, the positive portion of the after shock wave therefrom occurring at a time after the primary shock wave dependent on the pressure of the water at said fourth depth, the negative portion of said after shock wave being separated from its positive portion by the same time separation that the negative portion of the primary wave is separated from its positive portion, the round-trip time for said fourth source being longer than the round-trip time for said third source, the pressure for said fourth source being greater than the pressure for said third source, thereby causing the relative time of arrival of said after shock for said fourth source to be shorter than for said third source, said positive portions of the primary waves from said first, second, third and fourth sources occurring at a location below said fourth source before the negative portions of the primary waves from said first, second, third and fourth sources occur at said location, said negative portion of the after shock wave from said first source occurring before the positive portion of the after shock wave from said second source occurs at said location, said negative portion of the after shock wave from said second source occurring before the positive portion of the after shock wave from said third source occurs at said location, said negative portion of the after shock wave from said third source occurring before the positive portion of the after shock wave from said fourth source occurs at said location, whereby, the primary shock wave energy accumulates in a frequency spectrum range lower than the frequency spectrum for said individual first, second, third and fourth sources.

13. A marine seismic source in accordance with claim 12, wherein the primary shock wave energy accumulates in a frequency range primarily between 25 and 250 Hz.

14. A method of establishing a marine seismic source wave, which comprises;

detonating a first gas expansible source at a first depth below the surface of the water, the negative portion of the primary wave therefrom being separated from the positive portion dependent on the round-trip acoustical travel time of the source impulse to the water surface, the positive portion of the after shock wave therefrom occurring at a time after the primary shock wave dependent on the pressure of the water at said first depth, the negative portion of said after shock wave being separated from its positive portion by the same time separation that the negative portion of the primary wave is separated from its positive portion, detonating a second gas expansible source at a second depth below the surface of the water greater than said first depth, the negative portion of the primary wave from said second source being separated from the positive portion thereof dependent on the round-trip acoustical travel time of the source impulse to the water surface, the positive portion of the after shock wave therefrom occurring at a time after the primary shock wave dependent on the pressure of the water at said second depth, the negative portion of said after shock wave being separated from its positive portion by the same time separation that the negative portion of the primary wave is separated from its positive portion, the round-trip time for said second source being longer than the round-trip time for said first source, the pressure for said second source being greater than the pressure for said first source thereby causing the relative time of arrival of said after shock for said second source to be shorter than for said first source, said positive portions of the primary waves from said first and second sources occurring at a location below said second source before the negative portions of the primary waves from said first and second sources occur at said location, said negative portion of the after shock wave from said first source occurring before the positive portion of the after shock wave from said second source occurs at said location, whereby the primary shock wave energy accumulates in a frequency spectrum below the frequency range for an individual first or second source and the after shock wave energy does not accumulate.

15. A method in accordance with claim 14, wherein said primary shock wave energy accumulates in a frequency range primarily between 25 and 250 Hz.

16. A method in accordance with claim 14, which comprises the additional step of;

detonating a third gas expansible source at a third depth below the surface of the water greater than said second depth, the negative portion of the primary wave from said third source being separated from the positive portion thereof dependent on the round-trip acoustical travel time of the source impulse to the water surface, the positive portion of the after shock wave therefrom occurring at a time after the primary shock wave dependent on the pressure of the water at said third depth, the negative portion of said after shock wave being separated from its positive portion by the same time separation that the negative portion of the primary wave is separated from its positive portion, the round-trip time for said third source being longer than the round-trip time for said second source, the pressure for said third source being greater than the pressure for said second source, thereby causing the relative time of arrival of said after shock for said third source to be shorter than for said second source, said positive portions of the primary waves from said first, second and third sources occurring at a location below said third source before the negative portions of the primary waves from said first, second and third sources occur at said location, said negative portion of the after shock wave from said first source occurring before the positive portion of the after shock wave from said second source occurs at said location, said negative portion of the after shock wave from said second source occurring before the positive portion of the after shock wave from said third source occurs at said location, whereby the primary shock wave energy accumulates in a frequency spectrum below the frequency range for an individual first, second or third source and the after shock wave energy does not accumulate.

17. A method in accordance with claim 16, wherein said first, second and third sources are detonated substantially simultaneously and wherein the depths of said first, second and third sources are such that sustained blow-out occurs at said water surface from the detonation of all three sources.

* * * * *